No. 766,680. PATENTED AUG. 2, 1904.
W. FETZER.
CONTROLLING MECHANISM FOR FERTILIZER DISCHARGERS.
APPLICATION FILED OCT. 29, 1903.
NO MODEL.
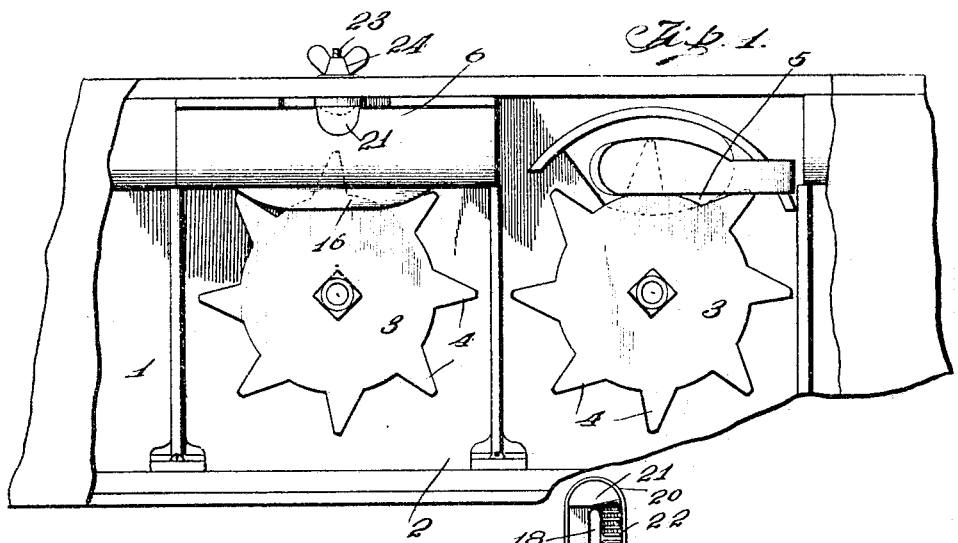
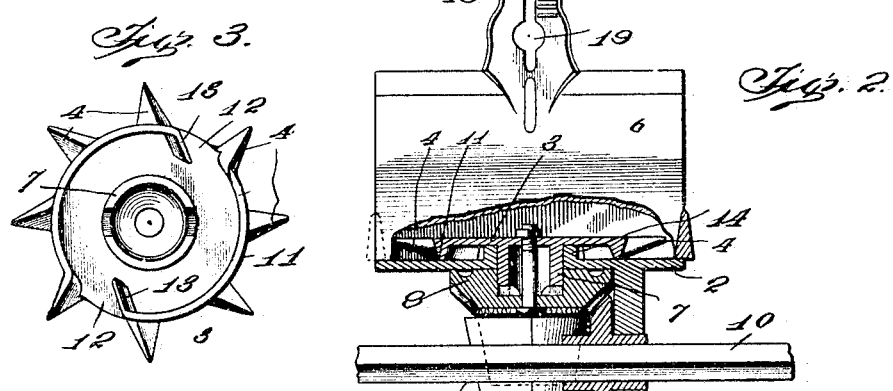
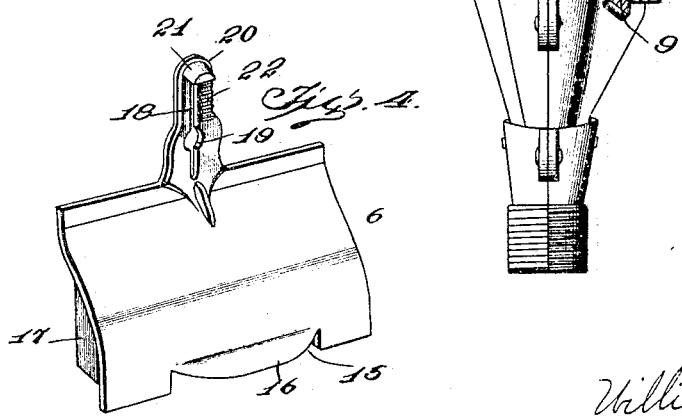
Witnesses
Inventor
William Fetzer
By
Mason Fenwick & Lawrence
Attorneys No. 766,680. Patented August 2, 1904.

UNITED STATES PATENT OFFICE.

WILLIAM FETZER, OF MIDDLETOWN, OHIO.

CONTROLLING MECHANISM FOR FERTILIZER-DISCHARGERS.

SPECIFICATION forming part of Letters Patent No. 766,680, dated August 2, 1904.

Application filed October 29, 1903. Serial No. 179,065. (No model.)

*To all whom it may concern:*

Be it known that I, WILLIAM FETZER, a citizen of the United States, residing at Middletown, in the county of Butler and State of Ohio, have invented certain new and useful Improvements in Controlling Mechanism for Fertilizer-Dischargers; and I do hereby declare the following to be a full, clear, and exact description of the invention, such as will enable others skilled in the art to which it appertains to make and use the same.

This invention relates to improvements in fertilizer-distributers, and particularly to mechanism for controlling material in the trough of the distributer and delivering it therefrom.

It consists in a feeding mechanism comprising a trough having an outlet-opening, a feed-wheel mounted therein and provided with a peripheral rim, underlying ribs projecting inwardly beneath the wheel from the edge thereof, the rim being provided with openings adjacent to the said underlying ribs for permitting the discharge of material which may have worked beneath the edge of the wheel.

The invention further consists in a distributing mechanism comprising a trough, a feed-wheel mounted therein, an adjustable shed arranged to coöperate with the wheel for controlling the feed of the fertilizers, and means for controlling the height of the said shed with respect to the wheel.

It also consists in certain other novel constructions, combinations, and arrangements of parts, as will be hereinafter fully described and claimed.

In the accompanying drawings, Figure 1 is a top plan view of a portion of the distributing-hopper, showing feed-wheels arranged therein and an adjustable shed in position over one of said wheels. Fig. 2 is a detail sectional view through one of the feed-wheels, a portion of the shed being broken away and parts of the adjacent mechanism being shown in elevation. Fig. 3 is a bottom plan view of a feed-wheel. Fig. 4 is a detail perspective view of the adjustable shed.

It is the purpose of this invention to supply means for feeding and controlling material from a hopper or other receptacle which will be able to perfectly clear itself from all accumulations between the parts and which may be adjusted to permit of the greater or less discharge of fertilizer from the hopper, as found desirable.

In the accompanying drawings I have illustrated the features of my invention, showing the same arranged in the hopper 1 of any suitable fertilizer-distributer. The floor 2 of the hopper is preferably flat, and feed-wheels 3 are arranged at suitable intervals, the said wheels being provided with projecting feeding-teeth 4, which extend over distributing outlets or openings 5 in the floor of the hopper. Coöperating with each feed-wheel 3 is an adjustable and quickly-removable shed or housing 6, which is secured to the walls of the hopper and overhangs the discharge-opening 5 and a portion of the wheel or disk 3. The feed-wheel is made with a central hub portion 7, which projects through an opening in the floor of the hopper and engages a driving-gear 8. The gear 8 meshes with an actuating-pinion 9, carried by a driving-shaft 10, located below the hopper. In employing feed-wheels of this character in the distributing-hopper of the fertilizer it is found that the material from the hopper is continually working beneath the peripheral edge of the feed-wheel, and as it accumulates it tends to clog and more or less retard the movement of the feed-wheel, causing undue friction as well as tending to lift the same from proper contact with the floor of the hopper.

The present invention is provided with means formed upon the feed-wheel for gathering and discharging all such material as works beneath the edge of the feed-wheel. The feed-wheel 3 is formed with a downwardly-extending peripheral flange 11, which travels closely upon the surface of the hopper-floor. At one or more places the peripheral flange 11 is provided with openings 12, which communicate with the spaces beneath the feeding portion of the wheel 3. The wheel carries upon its under surface underlying ribs 13, adjacent to the said openings and arranged in such an oblique line with respect to the periphery of the wheel as to collect material which may gather beneath the rim of the wheel and direct the same out through the openings 12. In this manner any material which will work beneath the edge of the wheel is collected and discharged at the periphery of the wheel and not permitted to gather beneath the wheel at all. The periphery of the wheel is provided with a series of projecting feed-teeth 4, which are preferably set at a slight angle with respect to the periphery of the wheel. These teeth 4 are made to taper toward their outer ends and are also beveled upon their under surfaces, as shown in Figs. 2 and 3, the beveled portion also tapering toward the outer ends of the teeth. By this construction the outer ends of the teeth are lifted somewhat from the floor of the hopper, and while they engage the material in the usual manner they are capable of delivering more material to the discharge-outlet of the hopper and are less likely to become clogged than teeth which rest throughout their length upon the surface of the hopper-floor. The underlying ribs 13 may project inwardly to the hub of the wheel, if desired, but are preferably made comparatively short, so as to leave a space between their inner ends and the hub of the wheel. This space is almost filled, however, by an upwardly-projecting annular wall 14, arranged about the opening in the hopper-floor through which the hub 7 of the wheel passes. The underlying ribs 13 project thus quite close to the wall 14 and are in position to collect practically all the material which works its way beneath the same.

The shed 6 extends from a point upon one wall of the hopper inwardly and downwardly in the hopper, so that a portion of the shed overhangs the path of the teeth 4 of the wheel 3. The inner surface of the shed is preferably curved slightly, and the central lower edge of the shed is formed with an opening 15, into which the teeth of the feed-wheel may pass. This opening 15 is preferably guarded by lip 16, projecting into the hopper, which is formed upon the shed and made of about the same length as the said opening. In this manner material within the hopper is prevented from being thrown into the discharge-outlet at too great a rate of speed. While the shed may be made in various lengths, I preferably provide each feed-wheel with its individual shed 6, as shown in the drawings. The shed is strengthened by inner ribs 17, extending from the lower edge of the shed to a point near the upper edge thereof. Each shed is suspended by means of a projection extending upwardly therefrom, the said projection being formed with an elongated slot 18 extending vertically therein and formed with an enlarged space 19. The space or aperture 19 is made of sufficient size to be easily placed over the head or nut of a screw extending through the walls of the hopper. The upper end of the suspending projection 20 is formed with a lift 21, which may be engaged by the finger for lifting or depressing the shed. The inner surface of the projection 20 is preferably roughened or corrugated, as at 22, for firmly engaging the head or nut of an adjusting screw or bolt. As shown in Fig. 1, a bolt 23 may be employed having its head projecting into the trough, while its outer end is threaded and engaged by a thumb-screw 24. The enlarged space or aperture 19, formed in the slot 18, makes it possible to place the shed upon the bolt or remove it therefrom when the bolt is loosened. The slot being elongated permits the shed to be raised and lowered upon said bolt, and by operating the thumb-nut 24 the shed can be clamped at any desired height with respect to the feed-wheel 3. In order to adjust the shed to a different height, it is only necessary to loosen the thumb-nut 24 and grasp the lift 21, when the shed may be raised or lowered to the desired height. In order to remove the shed, the thumb-nut is loosened, so as to loosen the bolt 23, when the aperture 19 may be brought opposite the head of the bolt and the shed may be removed therefrom. The necessity for entirely removing the bolt is thus obviated, and much time is saved in the placing of the sheds in position or the removal of them from their position in the hopper.

In using fertilizers in a machine of this kind the parts are very apt to become rusted and clogged because of the ingredients employed in most of the fertilizers in common use. The mechanism above described is, however, so formed as to minimize the chance of clogging and to make it possible to feed the fertilizer to the greatest advantage. The height of the shed with respect to the wheel controls the amount of fertilizer which is carried to the discharge-outlet by the wheel. There are as many wheels as there are discharge-outlets in the hopper and preferably as many sheds as there are wheels. The parts are simple in structure and effective in use. The ribs 17 upon the shed brace the same with respect to the wall of the hopper and properly space the lower edge of the shed from said wall.

Having thus fully described my invention, what I claim as new, and desire to secure by Letters Patent, is—

1. A distributing mechanism comprising a feed-wheel formed with a downwardly-projecting peripheral flange having an opening therein, and an underlying collecting-rib extending beneath the wheel and arranged adjacent to the said opening.

2. A feed mechanism for distributing devices, comprising a wheel having peripheral openings and underlying ribs arranged at an angle to the periphery thereof, the said rib directing material to the said openings of the wheel as the wheel is revolved.

3. A feed-controlling mechanism, comprising a feed-wheel having projecting teeth at its periphery, an underlying annular flange formed with openings at suitable intervals, and oblique underlying ribs for collecting and directing material to and through said openings.

4. A feed-controlling mechanism comprising a feed-wheel formed with teeth at its edge, tapering upwardly and outwardly upon their under surfaces, an interrupted underlying annular flange carried by the wheel, and underlying ribs for collecting and directing material to the interrupted portions of said flange.

5. A discharge mechanism for fertilizer-distributers, comprising a feed-wheel arranged upon the floor of the feed-hopper, a shed overhanging a portion of the said wheel, and a substantially, horizontally projecting integral lip extending outwardly from the lower edge of the shed beneath which the feed-wheel moves.

6. A discharge-controlling mechanism for distributing-hoppers, comprising feed-wheels arranged upon the floor of the hopper, sheds arranged opposite each wheel, and a substantially horizontally-projecting flange projecting inwardly from the lower portion of each shed, said flange fitting snugly upon the upper surface of the wheel.

7. A discharge mechanism for distributing devices, comprising a hopper, feed-wheels mounted in the hopper, sheds for covering a portion of the feed-wheel, said sheds having a side and integral end walls, the edges of the sides of adjacent sheds abutting, while the end walls of each shed are arranged at a short distance from the end edges of the side walls.

8. A discharge-controlling mechanism for distributing devices, comprising a hopper, a feed-wheel mounted therein, and an inclined overhanging shed provided with integral end walls.

9. A discharge-controlling mechanism for distributing devices, comprising a feed-wheel, and an overhanging shed formed with integral closing-walls upon three sides, one of said sides being provided with an opening for receiving the periphery of the feed-wheel, and a horizontal flange projecting above said opening and extending over the feed-wheel.

10. A discharge-controlling mechanism for distributing devices, comprising a hopper, feed-wheels mounted therein, a shed mounted above the feed-wheels, and vertically-projecting ribs upon the under side of the said shed for spacing the shed a proper distance from the wall of the hopper.

11. A feed mechanism for distributing devices, comprising a wheel having discharge-passages in its periphery, and means for directing material through said discharge-passages when the wheel is revolved.

12. A feed mechanism for distributing devices, comprising a hopper, a feed-wheel mounted therein, a shed overhanging a portion of the feed-wheel, an upwardly-extending central integral projection formed upon the shed and provided with an elongated slot, the said slot having an enlarged portion for receiving the head of a bolt, and a bolt passing through the wall of the hopper and engaging the said slot for clamping the shed in operative position.

13. A discharge-controlling mechanism for distributing devices, comprising a hopper, a feed-wheel mounted therein, a shed overhanging a portion of the feed-wheel and the discharge-passage of the hopper, formed with an inclined side wall, an upwardly-extending vertical portion at the top of said wall, a centrally-arranged integral supporting projection extending upwardly from said vertical portion, a rib for strengthening the said projection with respect to the body portion of the shed, the said projection having a roughened bolt-engaging surface, a lift at the upper end of the projection, and a bolt for engaging the said roughened surface for clamping the shed in its adjusted position.

In testimony whereof I hereunto affix my signature in presence of two witnesses.

WILLIAM FETZER.

Witnesses:
   W. D. VORHIS,
   G. SULLIVAN.